United States Patent
Morita (10) Patent No.: US 6,530,027 B1
(45) Date of Patent: Mar. 4, 2003

(54) METHOD FOR REDUCING POWER CONSUMPTION, AND PORTABLE ELECTRONIC DEVICE AND ENTERTAINMENT SYSTEM THAT EMPLOY THE METHOD

(75) Inventor: Toru Morita, Kanagawa (JP)

(73) Assignee: Sony Computer Entertainment Inc., Tokyo (JP)

( * ) Notice: Subject to any disclaimer, the term of this patent is extended or adjusted under 35 U.S.C. 154(b) by 0 days.

(21) Appl. No.: 09/488,374

(22) Filed: Jan. 20, 2000

(30) Foreign Application Priority Data

Jan. 21, 1999 (JP) ............................................ 11-013503

(51) Int. Cl.$^7$ ................................................ G06F 1/28
(52) U.S. Cl. ........................ 713/322; 713/321; 713/324; 713/330; 713/501; 713/601; 455/95; 455/757; 700/22
(58) Field of Search .................... 455/95, 757; 361/814; 700/22; 379/413; 713/321–324, 330, 501, 601

(56) References Cited

U.S. PATENT DOCUMENTS

| 4,466,326 A | | 8/1984 | Ogura et al. |
| 4,500,211 A | | 2/1985 | Hashimoto et al. |
| 5,167,024 A | * | 11/1992 | Smith et al. ................. 713/322 |
| 5,546,591 A | * | 8/1996 | Wurzburg et al. .......... 713/322 |
| 5,617,571 A | * | 4/1997 | Tanaka ........................ 713/324 |
| 5,692,201 A | * | 11/1997 | Yato ........................... 713/322 |
| 5,804,749 A | | 9/1998 | Shirakawa et al. |
| 5,822,598 A | * | 10/1998 | Lam ........................... 713/324 |
| 5,930,110 A | * | 7/1999 | Nishigaki et al. ........... 361/686 |

FOREIGN PATENT DOCUMENTS

EP 0 730 217 A1 9/1996

* cited by examiner

Primary Examiner—Thomas Black
Assistant Examiner—Luke T. Huynh
(74) Attorney, Agent, or Firm—Katten Muchin Zavis Rosenman (57) ABSTRACT

A portable electronic device and method manage battery-produced power without lowering sound quality for music and other sound effects. In the present invention, an operation clock of the CPU of the portable electronic device and a processing wait time for image drawing are dynamically controlled. When there is no sound emission request, the CPU runs at a low clock rate. Where there is a sound emission request, the CPU runs at a high clock speed. When the sound emission ends, the CPU returns to the low clock rate. A user senses no apparent change, as the CPU slows screen drawing speed at high clock speed and increases screen drawing speed at low clock speed.

11 Claims, 9 Drawing Sheets

METHOD FOR REDUCING POWER CONSUMPTION, AND PORTABLE ELECTRONIC DEVICE AND ENTERTAINMENT SYSTEM THAT EMPLOY THE METHOD

FIELD OF THE INVENTION

This invention concerns a method, a portable electronic device, and an entertainment system in each of which power consumption can be economized by changing a CPU operation clock.

BACKGROUND OF THE INVENTION

A conventional memory card device, etc. (slave machine) that is used with being inserted into an information device or other master machine such as an entertainment system represented by a game machine has an interface for connecting it to the main unit (master machine) of the information device and a nonvolatile memory element for storing data.

Figure 1A:
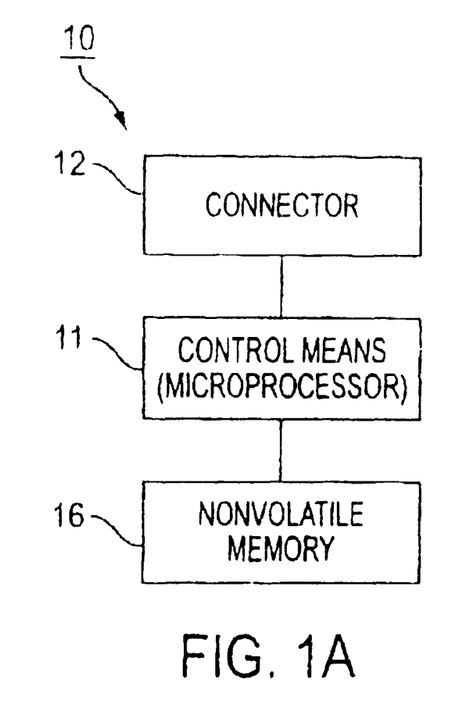
FIG. 1 shows an example of the configuration of a conventional memory card.

FIG. 1A shows an example of the composition of the key parts of such a conventional memory card device. The conventional memory card 10 has a control unit 11 for controlling its operation, a connector 12 for connecting the card device to a terminal provided in a slot of an information device, and a nonvolatile memory 16 for storing data. Connector 12 and nonvolatile memory 16 are connected by the control unit 11.

Control unit 11 may be, for example, a microprocessor (so labeled in the diagrams). Used as nonvolatile memory 16 is, for example, a flash memory such as an EEPROM (electrically erasable and programmable ROM). A microprocessor is also sometimes used for the connection interface with an information device, etc. as a control means for interpreting the protocol.

Figure 1B:
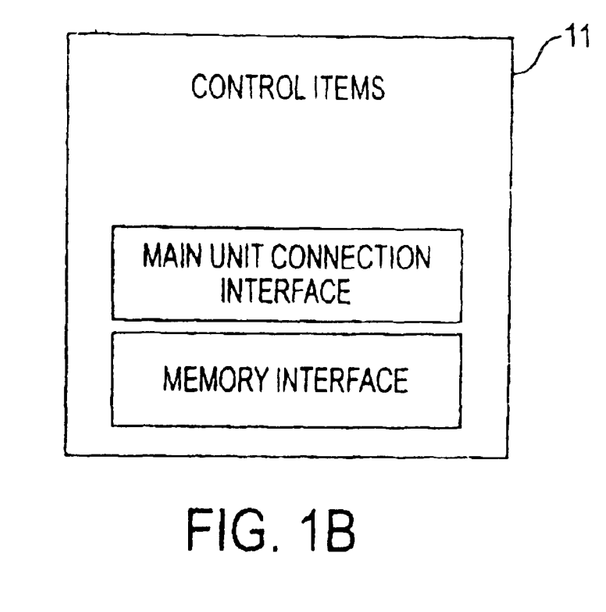

FIG. 1B shows the control elements in control unit 11 of conventional memory card 10.

Thus a conventional memory card has a main unit connection interface for connecting with the main unit of the information device, etc., and a memory interface for inputting and outputting data to and from the nonvolatile memory.

A conventional video game device such as a home video game device has the function of storing game data, etc. in an auxiliary memory. The memory card device is also used as an auxiliary memory of such video game device.

Figure 2:
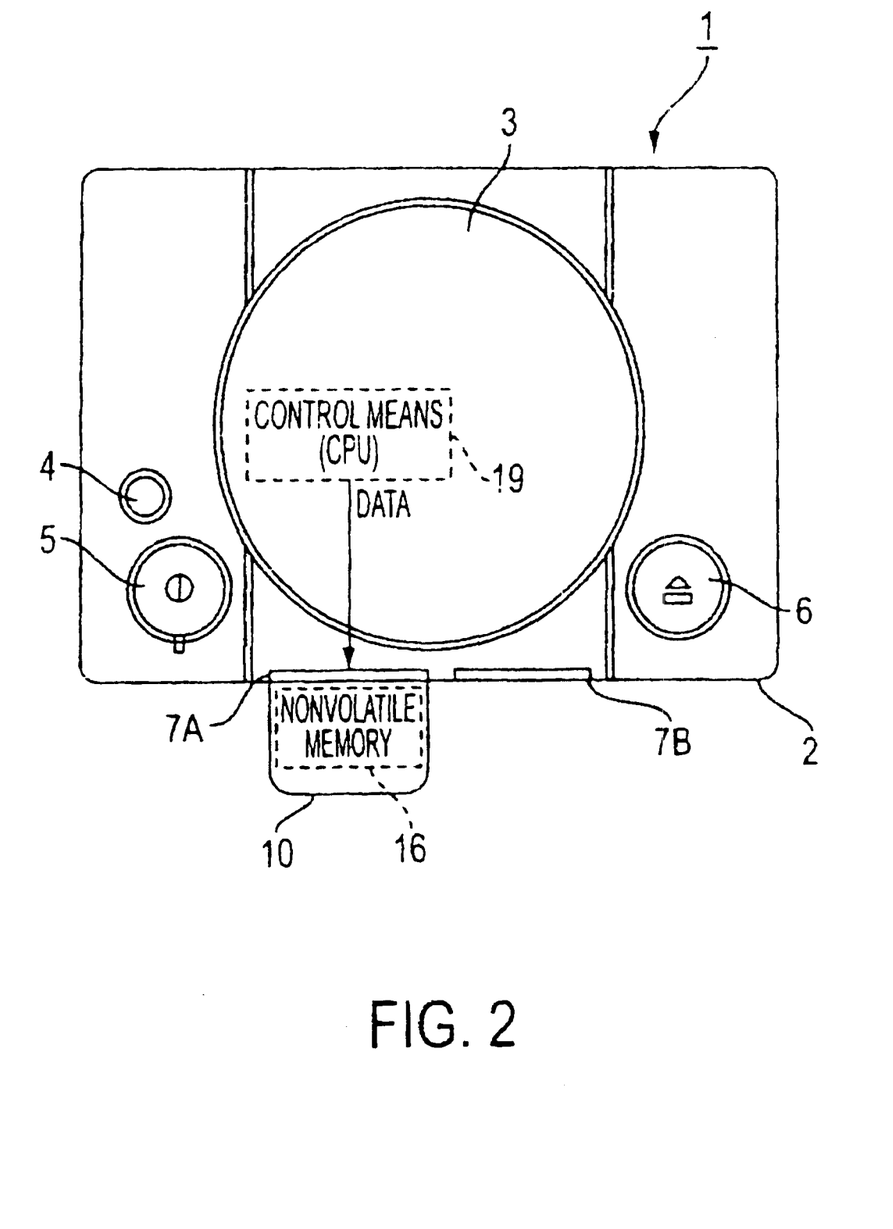
FIG. 2 shows an example of a conventional video game device that employs a memory card as an auxiliary memory.

FIG. 2 shows an example of a conventional video game device that uses a memory card as an auxiliary memory. Main unit 2 of this conventional video game device 1 has a disk loading unit 3, which is accommodated in a roughly rectangular housing and in the center of which is mounted an optical disk, which is a recording medium on which video game application programs are stored, a reset switch 4 for resetting the game at will, a power switch 6, and, for example, two slots 7A and 7B.

Memory card 10, which is used as an auxiliary memory, is loaded in slots 7A and 7B, and for example, the results, etc. of a game played on the video game device 1 are sent from control means (CPU) 19 and are written into nonvolatile memory 16. Multiple operation devices (controllers) not shown can also be connected to slots 7A and 7B, allowing multiple users to play competitive games, etc. simultaneously.

One could further give the function of executing a game and other programs to a slave machine that is connected using the memory card slot of an entertainment system, which serves as the master machine. That is, it is thought that after at least part of a program such as a game will be downloaded from the master machine, the program itself will be executed, and if the program is a game, it will be given the function of allowing the growth, etc. of the characters in the game. Such a portable electronic device (slave machine) can be used without modification as a portable information terminal, and by making communication with other devices easier, its range of applications can be expanded, thereby leading to the stimulation of new demand.

Removed from the master machine, such a portable electronic device drives, using an AC adaptor, a battery, etc., a central processing unit (CPU) that performs image processing, audio processing, etc. In particular, a battery is used if the portable electronic device is used portably. With a portable electronic device in such a case, it is important how efficiently the limited battery is used.

Meanwhile, among portable electronic devices, with those that employ a system in which the speaker is driven from the CPU via a digital/analog converter (DAC), if a musical piece or sound effects are to be emitted, a frequency at least twice that of the frequency to be emitted is required, so it is considered difficult to emit high-quality sounds without a rather high operation clock.

However, as stated above, in order to emit high-quality sound with a portable electronic device in which a CPU and DAC are directly connected, the CPU operation clock must be made high, creating the problem of high power consumption.

SUMMARY OF THE INVENTION

This invention, which was devised with the above problems in mind, provides, for the problems to be solved, a method and device that can use the battery of a portable electronic device efficiently without lowering the quality of the music, sound effects, and other sound that is emitted.

According to a first aspect of the present invention, there is provided a method of reducing power consumption, wherein a speaker is driven under a CPU instruction, and when audio sound is to be output, an operation clock with a CPU is varied by a sound emission request. The operation clock can be changed to either a high-speed mode or a medium-speed mode by the sound emission request, and otherwise it is set to a low-speed mode.

According to a second aspect of the present invention, there is provided a portable electronic device comprising a speaker driven by a CPU via a digital/analog converter, wherein a sound emission request is input to a bus controller that is linked to said CPU; and a close variation means controlled in accordance with the input to said bus controller, and an operation clock is made variable.

According to a third aspect of the present invention, an entertainment system is provided, which includes an entertainment device that has a program execution function and a portable electronic device that is detachably mounted on said entertainment device and includes an interface for making an electrical connection to said entertainment device, and in which the portable electronic device comprising a speaker driven by a CPU via a digital/analog converter, wherein sound emission requests are input to a bus controller that is linked to said CPU; a clock variation means controlled in accordance with the input to said bus controller, and wherein an operation clock is made variable.

DETAILED DESCRIPTION OF THE PREFERRED EMBODIMENTS

The present invention will hereinafter be described in detail.

A method according to a first aspect of the present invention will be described.

For both, long battery life of the portable electronic device and quality of the sound emission thereof, an operation clock of the CPU is controlled dynamically. That is, when there is no sound emission, the CPU is run at a low clock, and if there is a sound emission request (trigger) as an occasion for varying the CPU clock, the CPU will be switched to run at a high clock, and when the sound emission ends, the CPU will again be made to run at a low clock. Also, since simply changing the CPU clock will also change the speed of screen drawing, the processing is done so that one does not feel any apparent clock change; this is done by making the processing wait longer if the clock is high, and conversely, making the processing wait shorter if the clock is low.

In this specification, the "processing wait" means the processing time for maintaining the screen drawing constant and is also referred as "interrupt latency".

Here, if it is the case of a portable electronic device, which will be described later on, a sound emission request may be a request for sound emission upon startup or a request for sound emission given by pressing an operation button, etc. In the case of a portable electronic device that has an indication means such as a cursor, one can cite cases in where request is made for a sound emission such as a sound to be emitted when an object is clicked with the cursor. Also, a sound emission request for emitting an alarm sound can be given in the case of, for example, a portable electronic device that has a built-in clock mechanism.

Figure 3:
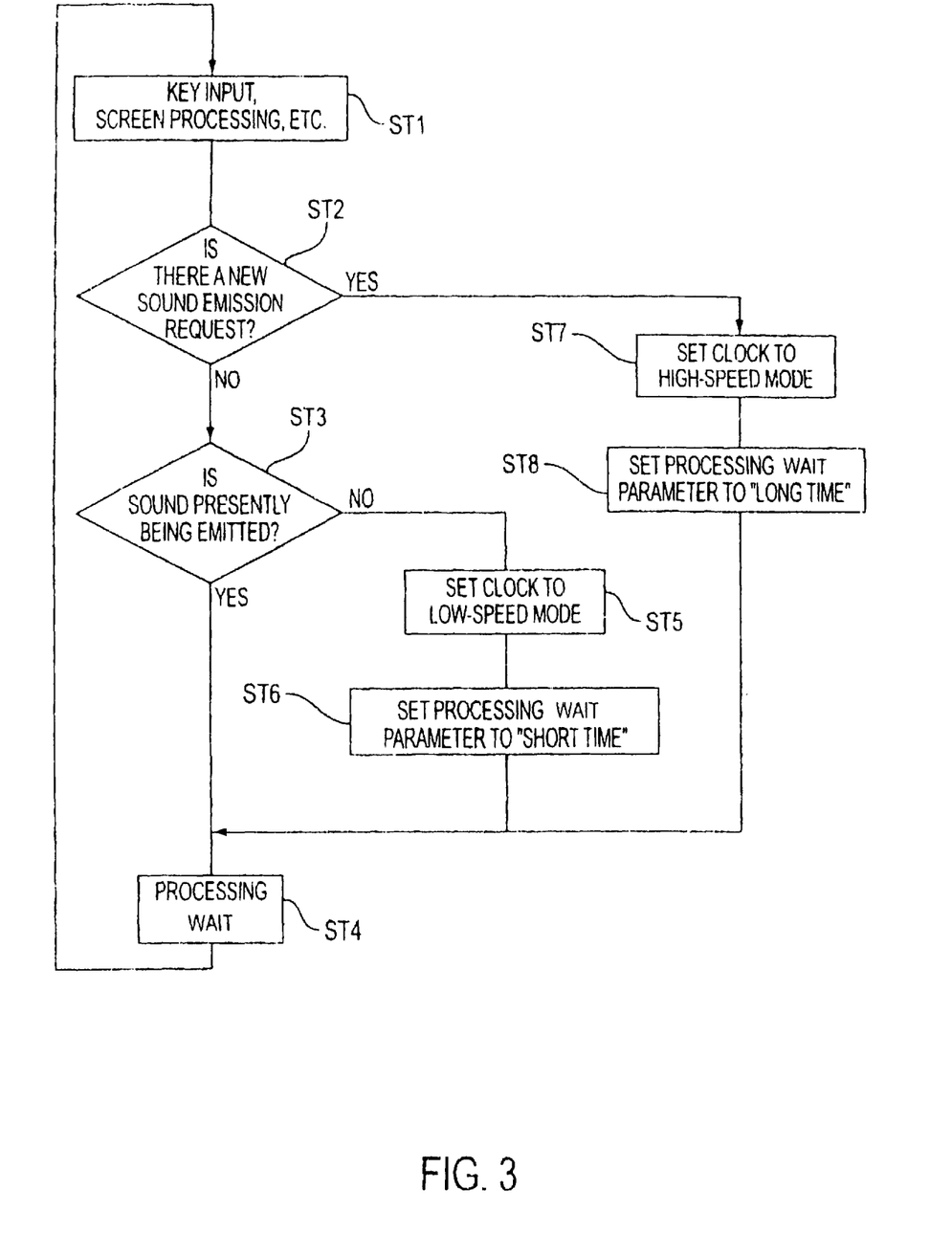
FIG. 3 is a flowchart for explaining the method of the present invention.

In the following, the first aspect of the invention will be described specifically with reference to the flowchart of FIG. 3. Referring to FIG. 3, the process is shown, in which the CPU clock frequency and the image drawing speed are changed while a game is being played on a portable electronic device detachably attached to a game machine.

With the portable electronic device, as shown in step 1 (ST1), the CPU handles the control of, for example, a key input for moving a game character, a screen processing such as drawing images of the background and characters, and sound emission information such as music or sound effects.

In step 2 (ST2), it is decided, during such control, whether there is a new sound emission request.

In step 2 (ST2), if there is no new sound emission request, it is decided in step 3 (ST3) whether the sound emission is currently taking place, and if it is, in step 4 (ST4) the current processing wait is maintained, and the key input and screen processing, etc. in step 1 (ST1) are continued.

If there is no new sound emission request and it is decided in step 3 (ST3) that the sound emission is not currently taking place, the CPU clock is switched to the low-speed mode in step 5 (ST5).

Also, for example in a portable electronic device, the clock of the CPU is normally run at a range from 32 kHz to 8 MHz.

If the CPU clock is switched to a low speed, because merely switching it to the low speed will also change the speed at which the screen drawing is done, it is necessary to control the screen drawing to keep the screen drawing constant so that there is no apparent change in the CPU clock. This processing is done in step 6 (ST6) and step 4 (ST4). More specifically, in step 6 (ST6), an interrupt processing such as a time interrupt processing is executed, and the screen drawing processing time is set to a short time. Then, in step 4 (ST4), control is executed so that the processing wait becomes a short time. Specifically, the prescribed interrupt time needed for the image drawing is set, and this interval of the interrupt time with respect to the interrupt time duration is made short in accordance with the CPU clock. After such processing is completed, the key input and screen processing, etc. of step 1 (ST1) is continued.

Returning to step 2, it will be now explained what happens if there is a new sound emission request.

It there is a sound emission request, following step 2 (ST2), one proceeds to step 7 (ST7), and the CPU clock is switched to a high-speed mode. Here, in the case of a portable electronic device, which is described below, the second emission request could be a sound emission request upon a startup or a sound emission request due to an operation button being pressed, and in the case of a game, the sound emission request could be a request to play sound effects or a musical piece requested in the game program.

As stated above, the CPU clock is switched to a high speed when there is a sound emission request. However, because such switching to a high speed also changes the speed of the screen drawing, it is necessary to control the screen drawing so that the screen drawing is kept constant and there is no change in the apparent CPU clock. This processing is done in step 8 (ST8) and step 4 (ST4). That is, in step 8 (ST8), the interrupt processing such as a time interrupt processing is done, and the screen drawing processing time is set to a long time period. Then, in step 4 (ST4), control is executed so that the processing wait becomes a long time. Specifically, the prescribed interrupt time needed for the image drawing is set, and this interval of the interrupt time with respect to interrupt time is made long in accordance with the CPU clock. After such processing is done, the key input and screen processing, etc. in step 1 (ST1) is continued.

As described above, in the method of the present invention, the CPU clock is changed in accordance with sound emission requests and the drawing speed is controlled so that there is no apparent change. In the method of this invention, the CPU clock and the drawing speed need not be controlled by the software according to the above procedure. The control may also be executed by mechanical means.

Also, in the method of the present invention, the CPU clock may be changed in two or more stages. For example, it may be done in two or three stages. For example, the clock frequency may be set to 512 kHz and 4 MHz if the clock is changed in two stages, or 512 MHz, 4 MHz, and 1 MHz if the clock is changed in three stages. By thus changing the clock in three stages, an appropriate clock frequency can be set in accordance with the sound emission request, and the appropriate clock frequency can be set by the relationship between the sound emission request and the burden on the CPU.

Also, in the method of the present invention, a sound emission request was cited as the occasion (trigger) for changing the CPU clock, but the CPU clock may be changed when the necessity arises to do screen drawing that involves heavy processing. In such a case, the appropriate clock frequency can be selected from the relationship between the power consumption and the burden on the CPU by changing the clock in three stages.

A second embodiment of the present invention will be described.

A second aspect of the present invention will be described.

A portable electronic device, shown in FIGS. 4A–4C and FIGS. 5–6, has a speaker driven by a CPU via a digital/analog converter. Sound emission requests are input to a bus controller that is linked to the CPU, a clock variation unit is controlled in accordance with the input to the bus controller, and the operation clock is varied.

Figure 4A:
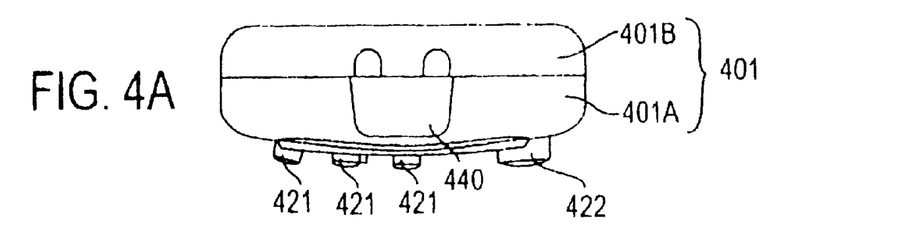
FIGS. 4A, 4B and 4C are front, plan, and rear views, respectively of the portable electronic device of the present invention.
Figure 4B:
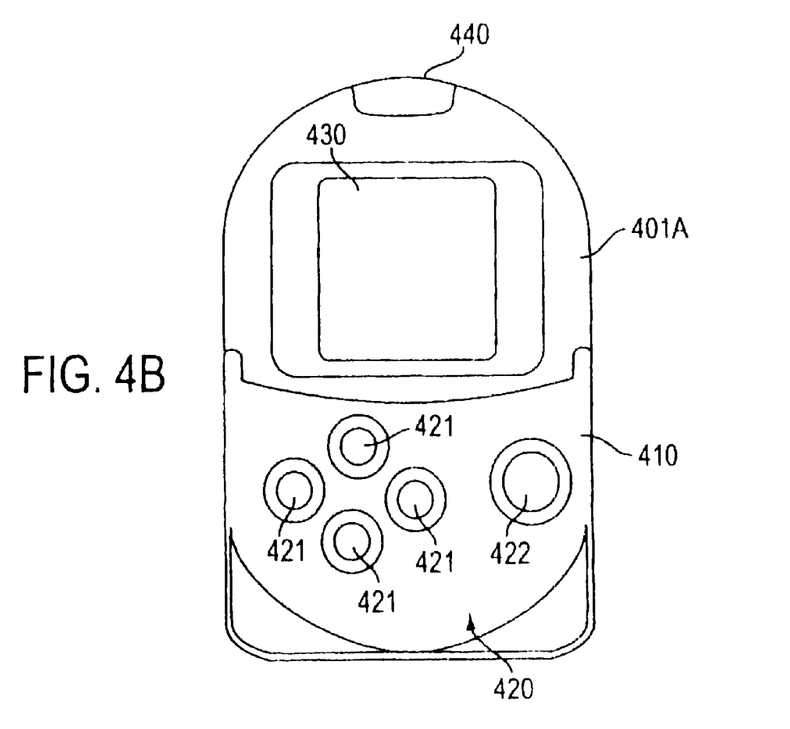
Figure 4C:
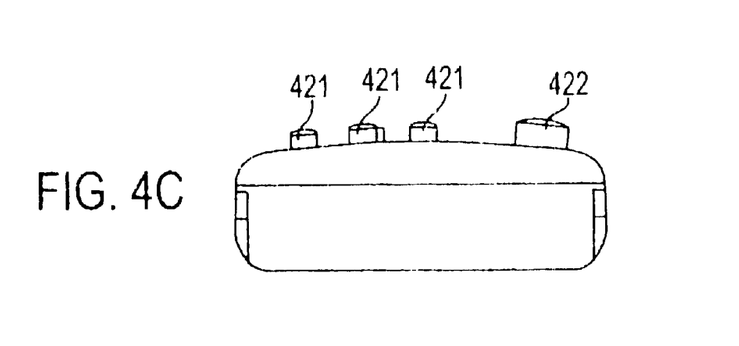

More specifically, an arrangement of the portable electric device will be described. FIGS. 4A–4C show a portable electronic device 400, which is an embodiment of the portable electronic device of this invention. As a detachable portable electronic device, the potable electronic device 400 constitutes a part of the entertainment system shown in FIGS. 7 and 8.

As shown in FIGS. 4A through 4C, portable electronic device 400 includes a housing 401 and has an operation unit 420 for the input of various information, a display unit 430, which consists of a liquid crystal display (LCD), etc., and a window 440 for performing wireless communication by, for example, infrared rays by a wireless communication unit.

Housed inside housing 401, which consists of an upper shell 401a and a lower shell 401b, is a substrate on which are mounted memory elements, etc. The housing 401 is shaped so as to allow insertion into prescribed slots of the main unit of an entertainment system such as the video game device described below.

Window 440 is provided at the other end of housing 401, which is formed in a roughly semicircular shape. Display unit 430 takes up about half the area of the upper shell 401a, which constitutes part of housing 401, and is positioned near the window 440.

Operation unit 420, which has one or more operation buttons 421, 422 for performing an event input and making various selections, is formed in upper shell 401a in the same way as window 440, and takes up about half the area of the side opposite the part where window 440 is positioned. Also, the operation unit 420 is positioned on a cover 410, which is supported rotatably with respect to housing 401. Here, operation buttons 421, 422 are arranged from the upper surface side to the lower surface side of cover 410 and pierce the cover 410. The operation buttons 421, 422 can move in or out with respect to the upper surface part of cover 410 and are supported by the cover 410.

Portable electronic device 400, which is inside housing 401, has a substrate positioned so as to be opposed to the cover 410, and also has switch pressing units on the top of the substrate. With cover 410 closed, the switch pressing units are provided in positions corresponding to the positions of operation buttons 421, 422. Thus when operation buttons 421, 422 are pressed, the switch pressing units press on pressing switches such as diaphragm switches.

Figure 5:
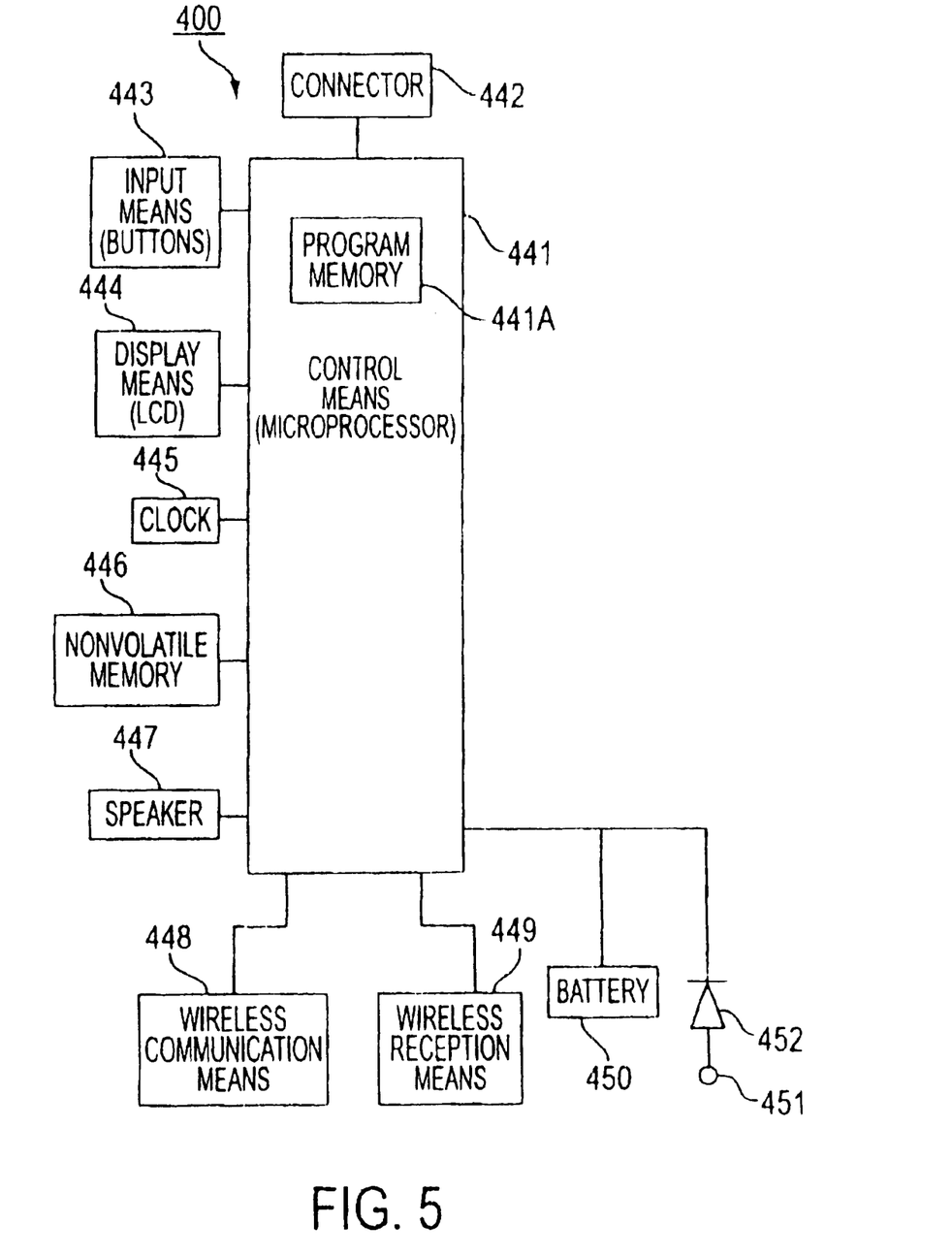
FIG. 5 is a block diagram of the portable electronic device of the present invention.

As shown in FIG. 5, portable electronic device 400 has a control unit 441, a connector 442, an input unit 443, a display 444, a clock function unit 445, a nonvolatile memory 446, a speaker 447, a wireless communication unit 448 and a wireless reception unit 449 as data transmission and reception means, a battery 450, and a power source terminal 451 and a diode 452, which constitute a power storage means.

Figure 6:
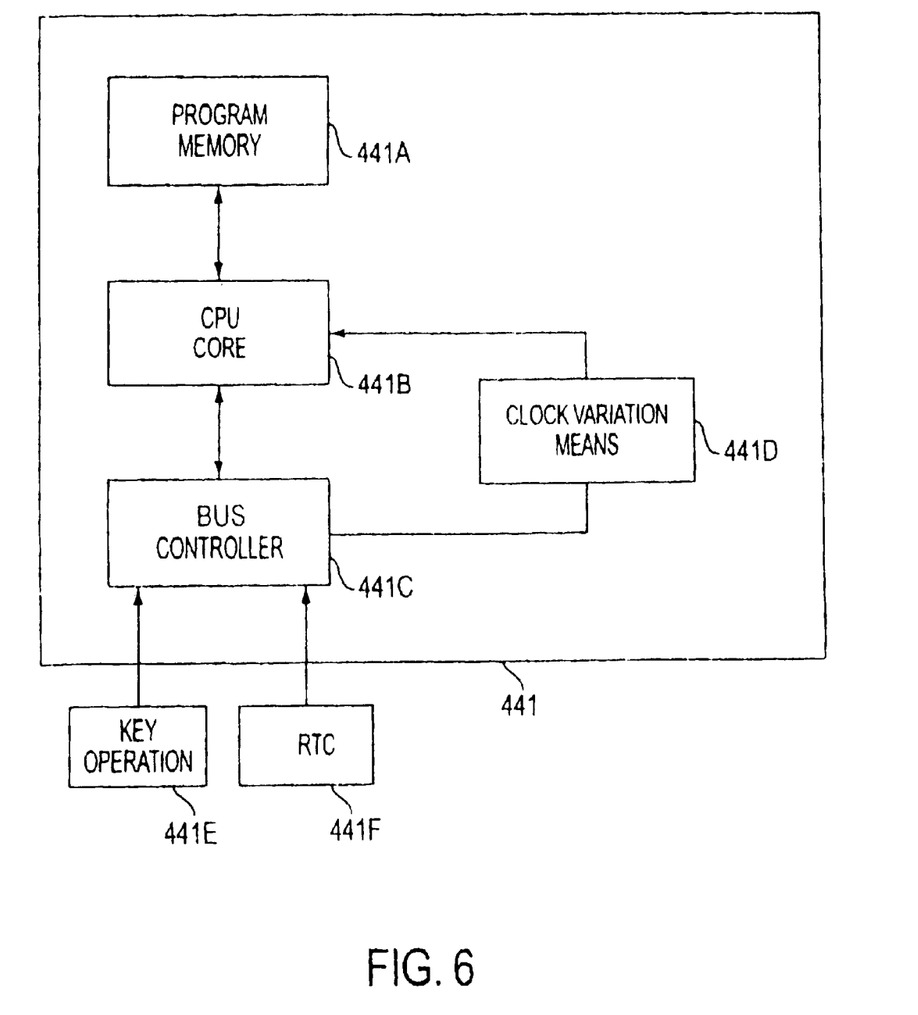
FIG. 6 shows an arrangement of a control unit of the portable electronic device of the invention.

The control unit 441 is constituted using, for example, a microprocessor. As shown in FIG. 6, control unit 441 includes a program memory 441a, which is a program storage means, a CPU core unit 441b, the bus controller unit 441c, and the clock variation unit 441d.

In varying the CPU clock according to this invention, any trigger information (information that results in a request for sound emission) such as key operation 441e or a RTC (real-time clock) 441f that is input to the clock variation unit 441d via the bus controller 441c, and the CPU clock is changed by the clock variation unit 441d. An example of a request for sound emission by RTC 441f would be an alarm output instruction at fixed times. A PLL (phase-locked loop) may be used for the clock variation unit 441d. A crystal may also be used as clock variation unit 441d. However, the crystal will then be positioned outside the control unit 441.

Connector 442 is constituted for connecting to the slot of another information device. For example, connector 442 has a data communication function for sending and receiving data to and from, for example, a video game device.

Input unit 443 has operation buttons, etc. for operating a stored program.

Display 444 has a liquid crystal display (LCD), etc., which is a display means for displaying various information.

Clock function unit 445 is constituted so as to display the time; for example, it can perform time display to display 444.

Nonvolatile memory 446 is an element for storing various data. For example, one can use for nonvolatile memory 446 a semiconductor memory element, such as a flash memory, in which the stored static lingers even if the power is cut off.

Because portable electronic device 400 has battery 450, one can use as nonvolatile memory 446 a static random access memory (SRAM), which allows data to be input and output at high speed.

Also, the provision of battery 450 makes it possible for the portable electronic device 400 to operate independently even in the state in which it is removed from the video game device main unit.

Battery 450 may be, for example, a rechargeable secondary battery. With portable electronic device 400 inserted into the video game device, battery 450 is supplied with power from the video game device. In this case, a power source terminal 451 is connected to the connection terminal of battery 450 via a reserve current prevention diode 452, and power is supplied when the portable electronic device 400 is connected to the video game device main unit.

Wireless communication unit 448 is a part that performs data communication with another memory card, etc. by infrared rays, etc.

Wireless reception means 449 is a part that has an antenna and a demodulation circuit, etc. That is, it is the part that receives various data that is transmitted by wireless broadcasting. This wireless reception unit 449 may have a memory for temporarily storing the broadcast data that is received.

Speaker 447 is a sound emission means that emits sound in accordance with the program, etc.

All of the above parts are connected to control unit 441 and operate under the control of control unit 441.

If for example the power of portable electronic device 400 is turned on, control unit 441 (microprocessor) shown in FIG. 5 performs an operation confirmation and other initialization of portable electronic device 400 as a whole, and then executes the application program stored in program memory 441a. By execution of this application program, control unit 441 controls display 444, speaker 447, etc. in accordance with the input from the user and consequently controls the display of images and the generation of sound effects and music.

In the portable electronic device of this invention, the above-described method of the present invention is carried out by the control unit 441. This procedure will hereinafter be described. In the following description, each step shown in FIG. 3 is cited in parentheses.

During the execution of a program stored in the program memory, for example, it is decided by control unit 441 whether there is a new sound emission request (ST2). If there is no new input information, it is decided whether a sound is currently being emitted (ST3), and if the sound is being emitted, the current processing wait is maintained (ST4), and the key input and the screen processing, etc. is continued (ST1).

If it is decided that no sound is currently being emitted, the CPU clock is switched to the low-speed mode (ST5). The switchover of the CPU clock to the low-speed mode is done, as described above, by clock variation unit 441d, such as a PLL or crystal oscillator, that can be used with the portable electronic device 400.

Also, for example in the portable electronic device, the clock of the CPU is normally run at a range from 32 kHz to 8 MHz.

If the CPU clock is switched to a low speed, because merely switching it to the low speed will also change the speed at which the screen drawing is done, it is necessary to control the screen drawing to keep it constant, with no apparent change in the CPU clock. In this processing, the interrupt processing such as the time interrupt processing is done, and the screen drawing processing time is set to a short time (ST6). Then control is executed so that the processing wait becomes a short time (ST4). Specifically, the prescribed interrupt time needed for the image drawing is set, and the interval of the interrupt time is made shorter in accordance with the CPU clock as compared with respect to the interrupt time. After such processing is done, key input and screen processing, etc. is continued (ST1).

It will be described next the case where there is a sound emission request.

If there is a sound emission request, the CPU clock is switched to a high-speed mode. The switching to the high-speed mode is done by clock control unit 441d, such as a PLL or crystal oscillator. Here, the sound emission request could be a sound emission request due to an operation button being pressed, or the sound emission request could be a request to play sound effects or a musical piece requested in the game program.

As stated above, the CPU clock is switched to the high speed when there is a sound emission request. However, because the switching to the high speed also changes the speed of the screen drawing, it is necessary to control the screen drawing so that the screen drawing is kept constant and there is no change in the apparent CPU clock. In this processing, first, interrupt processing such as the time interrupt processing is done, and the screen drawing processing time is set to a long time. Then control is executed so that the processing wait becomes a long time (ST8 and ST4). Specifically, the prescribed interrupt time needed for the image drawing is set, and the interval of the interrupt time is made longer in accordance with the CPU clock as compared with respect to the interrupt time. After such processing is done, key input and screen processing, etc. is continued (ST1).

As described above, this invention provides a device that changes the CPU clock in accordance with sound emission requests and controls the drawing speed so that there is no apparent change. In the portable electronic device of this invention, the CPU clock and the drawing speed can be controlled by hardware as in the above procedure, but they can also be controlled by software means.

Also, in the portable electronic device of this invention, the CPU clock frequency may be changed in two or more stages. Two or three stages are preferable. Specifically, it may be changed at 512 kHz and 4 MHz if the clock frequency is changed in two stages, or 512 kHz, 4 MHz, and 1 MHz if the clock frequency is changed and in three stages.

Also, in the portable electronic device of this invention, a sound emission request was cited as the occasion (trigger) for changing the CPU clock, but the CPU clock may be changed when the necessity arises to do screen drawing that involves heavy processing.

A third aspect of the present invention will be described.

An entertainment system of the present invention has an entertainment device that has a program execution function and a portable electronic device that is detachably mounted on the entertainment device and has an interface for making an electrical connection to the entertainment device. In the entertainment system the portable electronic device is constituted so that the speaker is driven by the CPU via a digital/analog converter, sound emission requests are input to a bus controller that is linked to CPU, a clock variation unit is controlled in accordance with the input to the bus controller, and the operation clock is made variable.

An arrangement of the entertainment system of the present invention will be described.

Figure 7:
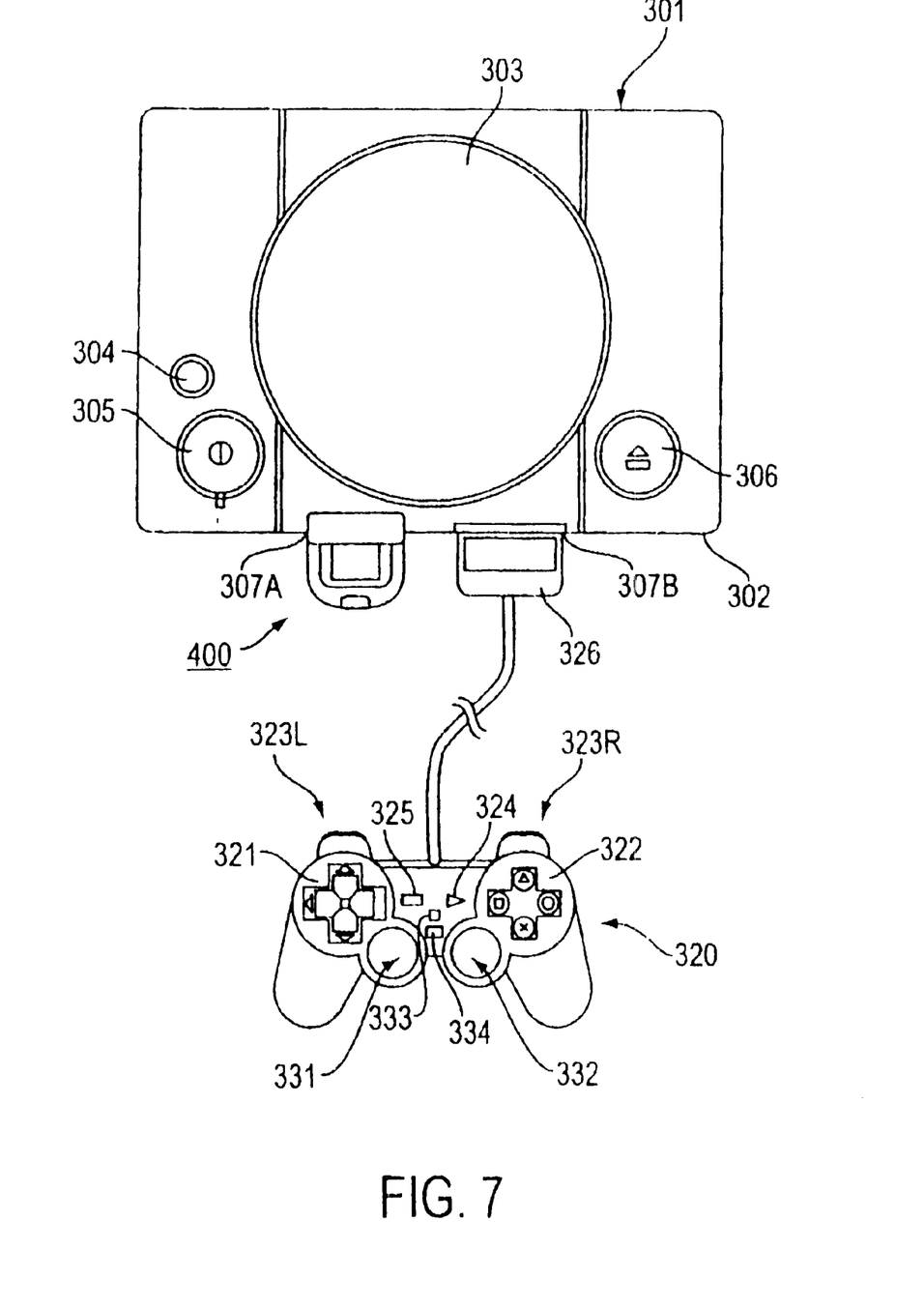
FIG. 7 is a plan view of the entertainment system of the present invention.
Figure 8:
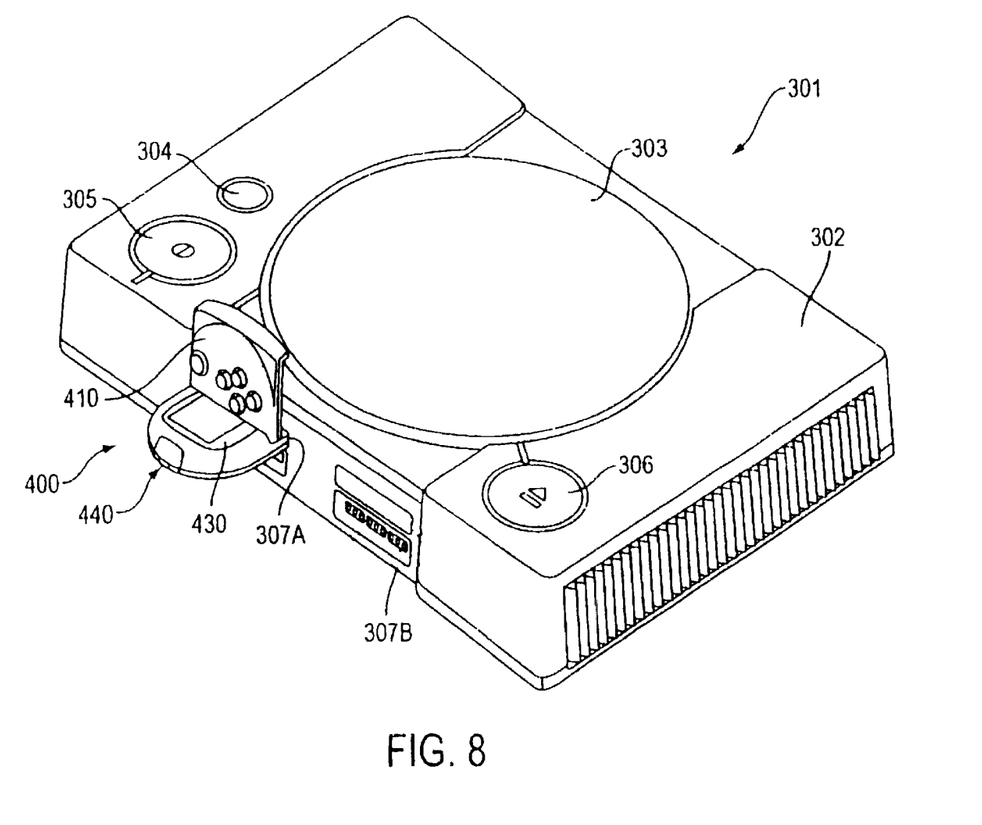
FIG. 8 is a perspective view of the entertainment system of the invention.

As shown in FIGS. 7 and 8, the entertainment system of this invention includes a video game device 301 and the portable electronic device 400, which can be attached to and detached from the video game device 301 and performs data communication with the video game device 301. In the entertainment system, the video game device 301 is constituted as the master machine, and portable electronic device 400 is constituted as a slave machine.

As shown in FIGS. 7 and 8, the video game device 301 reads an application program recorded on a recording medium and executes the program in accordance with instructions from the user (game player). For example, the progress, display and audio control of the game are done mainly by execution of the game.

A main unit 302 of video game device 301 has a disk loading unit 303, which is accommodated in a roughly rectangular housing in the center of which is loaded an optical disk, such as a CD-ROM, which is a recording medium for supplying a video game and other application programs, a reset switch 304 for resetting the video game at will, a power switch 305, a disk operation switch 306 for performing the operation of mounting the optical disk, and two slots 307A and 307B.

In video game device 301, the application program is not only supplied from a recording medium but is supplied via a communication circuit.

The portable electronic device 400 and controller 320 can be connected to slots 307A and 307B. A memory card system can also be connected to slots 307A and 307B.

Controller 320 has first and second operation units 321 and 322, a left button 323L and a right button 323R, a start button 324, a selection button 325, operation units 331 and 332 that are capable of analog operation, an operation mode selector switch 333 that selects the operation mode of operation units 331 and 332, and a display unit 334 for displaying the selected operation mode. Also, provided inside controller 320 is a vibration mechanism (not shown). The vibration mechanism vibrates controller 320 in accordance with, for example, the progress of the video game. The controller 320 is electrically connected by a connector 326 to slot 307B of the main unit 302.

For example, by connecting two controllers 320 to slots 307A and 307B, two game players can share this entertainment system. For example, a competitive game can be played by two game players. Slots 307A and 307B are not limited to the two as is the case here.

In an entertainment system constructed in this way, the portable electronic device 400 can be detachably attached to the entertainment system.

The appearance of video game device 301 and portable electronic device 400 is constituted as described above.

The entertainment system of this invention has portable electronic device 400 of the above discussed configuration, and in the portable electronic device, the CPU clock can be varied as explained above.

Figure 9:
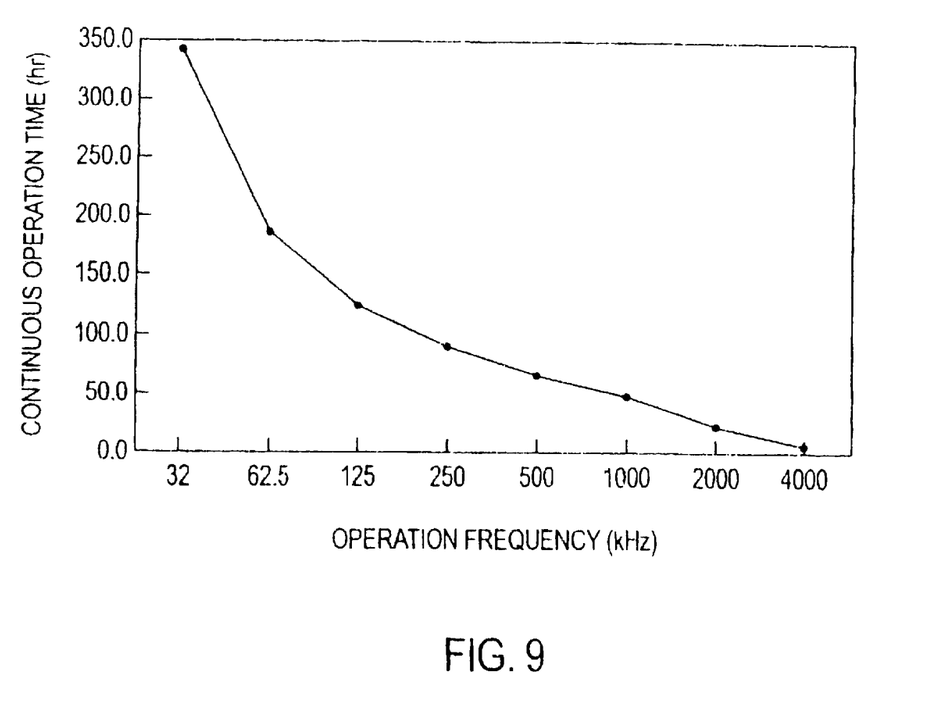
FIG. 9 shows a relationship between a CPU clock frequency and operation time in the case where the CPU clock frequency of the portable electronic device is modified according to the present invention.

According to the present invention, in the case of the portable electronic device 400, the power consumption when waiting can be reduced, for example, to about one-sixth (from 3.2 mA to 550 μA).

Also, the change in the continuous operation time with respect to the change in the clock frequency of the CPU was measured using portable electronic device 400 of this invention. The results are presented in Table 1 below.

TABLE 1

Operation frequency versus operation time

| Operation frequency (kHz) | Power consumption (mA) | Continuous operation time (hr) |
| --- | --- | --- |
| 32 | 0.46 | 330.0 |
| 62.5 | 0.82 | 180.0 |
| 125 | 1.10 | 120.0 |
| 250 | 1.38 | 90.0 |
| 500 | 1.70 | 65.0 |
| 1000 | 2.10 | 45.0 |
| 2000 | 3.20 | 19.0 |
| 4000 | 5.50 | 4.0 |

Table 1 shows the operation frequency (Hz), current consumption (mA), and continuous operation time (hr). For example, in the case of an operation frequency of 500 kHz, 1 MHz, and 4 MHz, the current consumption and continuous operation time were, respectively, 1.70 (mA), 65.0 (hr), 2.10 (mA), 45 (hr), and 5.50 (mA), 4.0 (hr). That is, it is clear that there is an up to 16-fold difference in operation time between a 500-kHz operation frequency and a 4-MHz operation frequency.

With this invention, for example, by changing the clock frequency of the CPU in accordance with sound emission requests, the lifetime of the battery used with the portable electronic device can be significantly prolonged, with no reduction in the quality of sound emission such as sound effects and music.

What is claimed is:

1. A power-consumption reduction method for reducing power consumption of an electronic device which outputs audio sound, comprising the steps of:

driving a speaker based on CPU instructions; and changing, when audio sound is to be output, an operation clock of said CPU in accordance with a sound emission request.

2. The method according to claim 1, wherein in the step of changing, when audio sound is to be output, an operation clock of said CPU in accordance with a sound emission request, said clock is set to a high-speed mode in accordance with a sound emission request and is set to a low-speed mode in other cases.

3. The method according to claim 2, wherein said high-speed mode is set in multiple stages.

4. A portable electronic device for driving a speaker by a CPU via a digital/analog converter, comprising:

a means in which sound emission requests are input to a bus controller coupled to said CPU, a clock variation means is controlled in accordance with an input to said bus controller, and an operation clock of said CPU is made variable.

5. The portable electronic device according to claim 4, wherein said sound emission request is either a key input operation or a real-time clock.

6. The portable electronic device according to claim 4, wherein the operation clock is set to a high-speed mode by said sound emission request and is set to a low-speed in other cases.

7. An entertainment system having an entertainment device which has a program execution function, and a portable electronic device which is detachably mounted on said entertainment device and has an interface for making an electrical connection to said entertainment device, comprising:

means in which said portable electronic drives a speaker by a CPU via a digital/analog converter; and means in which sound emission requests are input to said bus controller coupled to said CPU, and said clock variation means is controlled in accordance with an input to a bus controller, and an operation clock of said CPU is made variable.

8. A power consumption reduction method for reducing power consumption of an electronic device which can provide audio sound and display outputs, comprising the steps of:

driving a speaker based on CPU instructions;

changing, when audio sound is to be output, an operation clock of said CPU in accordance with a sound emission request, while controlling screen drawing to keep screen drawing constant so that there is no change in the apparent CPU clock.

9. A portable electronic device for driving a speaker by a CPU via a digital/analog converter and for controlling a display output, comprising:

a bus controller coupled to said CPU wherein sound emission requests are input to said bus controller;

a clock variation means being controlled in accordance with an input to said bus controller to change an operation clock of said CPU; and means responsive to change of the operation clock for controlling screen drawing to keep the screen drawing constant so that there is no change in the apparent CPU clock.

10. A power-consumption reduction method for reducing power consumption of an electronic device which includes a CPU, comprising the steps of:

providing the CPU with a burden to be processed on said CPU;

changing an operation clock of said CPU depending upon he burden to be processed on said CPU.

11. A power-consumption reduction method for reducing power consumption of an electronic device, said electronic device including a CPU and also being capable of providing display outputs, the method comprising the steps of:

providing the CPU with a burden to be processed on said CPU, and changing an operation clock on said CPU depending upon the burden to be processed on said CPU, while controlling screen drawing to keep the screen drawing constant so that there is no change in the apparent CPU clock.

* * * * *